United States Patent Office 2,862,930
Patented Dec. 2, 1958

2,862,930

HALOGENATION OF VAT DYESTUFFS

Armin Caliezi, Basel, Walter Kern, Sissach, and Theodor Holbro, Basel, Switzerland, assignors to Ciba Limited, Basel, Switzerland, a Swiss firm No Drawing. Application March 12, 1956
Serial No. 570,695

Claims priority, application Switzerland March 18, 1955

9 Claims. (Cl. 260—324)

Many methods are known for introducing halogen atoms into organic compounds. These methods generally involve the use of free halogen, for example, chlorine, or products, such as sulfuryl chloride, which behave like a mixture of sulfur dioxide and free chlorine, but in many cases these methods are disadvantageous, for example, in that the reaction proceeds very slowly on the large scale or the free halogen or hydrogen halide evolved during the reaction attacks the apparatus used, especially when the halogenation proceeds in the manner desired only under relatively severe conditions. Furthermore, it is difficult accurately to control the quantities of the usual halogenating agents owing to their volatility, so that in many cases continuous control is necessary during the halogenation. Halogenation products from different batches using the same starting materials frequently differ from one another in their composition.

The present invention is based on the observation that cyclic compounds which contain a carbonyl group bound to the ring and at most 7 benzene nuclei, which may be condensed, can be halogenated in an advantageous manner by heating the compound in an anhydrous halogenating agent which comprises a compound of the Friedel-Crafts type and sulfur trioxide, anhydrous sulfuric acid or a compound of the general formula $$R—SO_2\text{-Halogen}$$

in which R represents a hydroxyl or —O-metal group or an organic radical.

The compounds to be subjected to halogenation in the process of this invention are of cyclic character and contain carbonyl groups in the ring. Many of these compounds are capable of being vatted or themselves possess the character of a vat dyestuff. Among the non-vattable compounds of this kind there may be mentioned, for example, phthalic anhydride and substitution products thereof. As vattable compounds, which do not themselves possess the character of vat dyestuffs, there may be used, for example, benzoquinone, naphthoquinone, anthraquinone and substitution products of these compounds, for example, anthraquinone monosulfonic acids and the various anthraquinone disulfonic acids, and also hydroxyanthraquinones, nitroanthraquinones, aminoanthraquinones and anthraquinone carboxylic acids, and also benzanthrone.

Among vat dyestuffs proper there may be mentioned compounds of the anthraquinone series such as pyrazoleanthrones, anthra-pyrimidines, 1:2:5:6-di-(2'-phenylthiazole)-anthraquinones, anthraquinone-acridones such as anthraquinone-1:2-benzacridone or -naphthacridone, dianthrimides and carbazoles obtainable therefrom, condensation products of cyanuric chloride with aminoanthraquinones, indanthrone, dibenzpyrenequinone, anthanthrone, flavanthrone, acedianthrone and also α:β-bis-(anthronylidene)-ethane used as starting material for the latter, and also derivatives of the above mentioned compounds. There may also be used vat dyestuffs of the indigo series, such as indigo itself, thioindigo and substitution products thereof, and also bis-1:2:1':2'-naphthionaphtheneindigo. Among the anthraquinone compounds especially valuable results are obtained with anthraquinone, aminoanthraquinones, acedianthrones, the product obtained by alkaline condensation of Bz-1-anthraquinonylaminobenzanthrone, indanthrene, anthraquinone-C-diphenyl-dithiazoles, dibenzpyrene-quinones and anthranthrones.

As compounds of the Friedel-Crafts type there may be used with advantage the trihalides of iron or of aluminium frequently used as compounds of the said type, for example, aluminum chloride, or ferric chloride.

As compounds of the general formula $R—SO_2$-Halogen there may be used, for example, chlorosulfonic acid or fluorosulfonic acid or metal salts thereof, for example, their sodium salts. It is surprising that simple organic sulfonic acid chlorides, which cannot themselves easily be chlorinated, especially alkane sulfonic acid chlorides, such as methane sulfonic acid chloride, act in a similar manner. It is generally also possible to use in a similar manner sulfur trioxide or sulfuric acid (oleum) containing large amounts of sulfur trioxide or anhydrous sulfuric acid especially when the reaction conditions enable a compound of the above formula $R—SO_2$-Halogen to be formed therefrom.

In many cases it is of advantage to add to the anhydrides chlorinating agents of the above composition further substances which lower the melting point, for example, sodium chloride, sodium fluoride, calcium chloride, potassium chloride, sulfur dioxide, sodium sulfite or magnesium sulfate.

The halogenating agent can be obtained in a simple manner by mixing together the substances mentioned above, although in certain cases it may be uncertain to what extent the components of the mixture react together before the halogenation reaction sets in. In some cases it is of advantage to add the compound of the formula $R—SO_2$-Halogen (especially chlorosulfonic acid or sulfur trioxide or oleum) to the solid or molten compound of the Friedel-Crafts type (for example, aluminium chloride), since in this manner the stirrability of the melt is often improved. In some cases the compound to be chlorinated may be introduced into a melt of a compound of the Friedel-Crafts type, which is advantageously prepared with the substances mentioned above, and to add the sulfur trioxide or the compound of the formula $R—SO_2$-Halogen as the final component.

The halogenation must be carried out in an anhydrous medium. The temperature to be used generally depends on the temperature at which the halogenating agent forms a stirrable melt. Advantageously temperatures above 50° C. are used, and the temperature, according to need, being substantially above 100° C., for example, about 120–160° C., or in certain cases even above 200° C.

It is surprising that the present process can be carried out so that, notwithstanding the presence of strong sulfonating compounds, practically no sulfur or sulfonic acid groups enter the molecule of the compound being treated. That sulfur trioxide or a compound of the formula $R—SO_2$-Halogen nevertheless plays an important part in the halogenation reaction is evident from the fact that in general one halogen atom per molecule of $R—SO_2$-Halogen is introduced into the compound to be halogenated.

The mechanism of the halogenation probably takes place with the formation of complex salts according to Equations 1 and 2, although the invention is in no way limited to this theory.

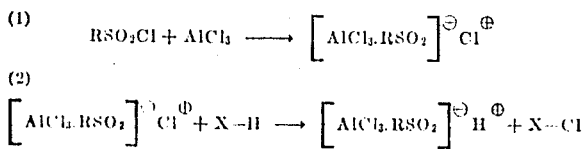

in which R represents an —OH or —O— metal group or an organic radical, and X—H represents the compound to be halogenated.

As practically no free halogen is formed in the reaction carried out in the anhydrous liquid halogenating agent, the reaction can be conducted without causing substantial injury to the apparatus. It is also of advantage that in many cases the halogenation is complete within 1–2 hours.

When the molecule of the substance to be halogenated is susceptible, for example, to intramolecular condensation or other form of ring closure, for example, carbazolization, such condensation or ring closure can in many cases be carried out together with the halogenation reaction.

The products obtainable by the present process are in part known or are isomeric with known products. However, they can be obtained by the present process in a simpler and more reliable manner without injury to the reaction vessel and very often in an astonishingly short time. The products obtainable by the present process are in part valuable intermediate products, or, when they possess the character of dyestuffs, are distinguished by various favorable properties, especially by the properties of fastness of their dyeings, for example, properties of wet fastness or fastness to light.

The following examples illustrate the invention, the parts and percentages being by weight:

Example 1

A mixture of 80 parts of anhydrous aluminium chloride, 13 parts of sodium chloride, 0.8 part of sodium fluoride and 5 parts of chlorosulfonic acid is heated at 140° C. until a clear melt is obtained. The temperature of the melt is then lowered to 90° C., and 5 parts of the dyestuff obtained by alkaline condensation from Bz-1-anthraquinonyl-amino-benzanthrone are added. The whole is stirred for one hour at 90–95° C., and the melt is then poured on to ice and water. The aqueous mixture is acidified with hydrochloric acid, heated for one hour and then filtered. The dyestuff is washed neutral and dried. It dyes cotton from a vat strong blue-green tints having very good properties of fastness. Its chlorine content is 26.9 percent.

A similar dyestuff is obtained by using fluoro-sulfonic acid instead of chlorosulfonic acid.

Example 2

5 parts of the dyestuff used in Example 1 are added to a melt of 80 parts of aluminium chloride, 13 parts of sodium chloride and 0.8 part of sodium fluoride at 90° C., and then 2 parts of methane sulfonic acid chloride are slowly added dropwise. The mixture is stirred for one hour at 90–92° C. and worked up as described in Example 1. There is obtained a sulfur-free dyestuff having a chlorine content of 11.5 percent. It dyes cotton from a vat strong dark olive tints having very good properties of fastness.

Example 3

10.4 parts of anthraquinone are added to a liquid melt of 100 parts of aluminium chloride, 20 parts of sodium chloride and 17.5 parts of chlorosulfonic acid at 120° C. The mixture is then heated in the course of 2 hours to 200° C., and stirred for one hour at that temperature. By working up in the usual manner there is obtained a sulfur-free product containing about 24 percent of chlorine.

Example 4

90 parts of aluminium chloride, 13 parts of sodium chloride, 0.9 part of sodium fluoride and 19 parts of chlorosulfonic acid are heated together at 150° C. until a clear melt is obtained. The temperature of the melt is then allowed to fall to 125° C. and 11.9 parts of 1:4-diaminoanthraquinone are introduced. The melt is stirred for a further hour at 125–130° C. and then worked up as described in Example 1. There is obtained a sulfur-free product having a chlorine content of about 31 percent.

Example 5

11.3 parts of α-aminoanthraquinone are added at 130° C. to a melt such as is used in Example 4, and then the mixture is stirred for one hour at 130–135° C. By working up there are obtained 12.2 parts of a chlorine-containing product free from sulfur.

Example 6

A mixture of 80 parts of aluminium chloride, 13 parts of sodium chloride, 0.8 part of sodium fluoride and 7.5 parts of chlorosulfonic acid is heated at 140° C. until a clear melt is obtained. The melt is cooled to 110° C. and 5 parts of acedianthrone are introduced. The whole is stirred for one hour at 110–115° C. and the reaction mixture is worked up in the usual manner. The sulfur-free product so obtained contains about 20 percent of chlorine. Instead of chlorosulfonic acid there may be used an equivalent proportion of its sodium or calcium salt.

Example 7

5 parts of 2:2'-dichloro-dianthrone-ethane (condensation product from 2 mols of 2-chloranthrone-(9) and 1 mol of glyoxal sulfate) are added at 90° C. to a liquid melt of 80 parts of aluminium chloride, 13 parts of sodium chloride, 0.8 part of sodium fluoride and 5 parts of chlorosulfonic acid. By working up in the usual manner there is obtained a sulfur-free strong red-brown vat dyestuff of the acedianthrone type having a chlorine content of about 21 percent.

Example 8

5 parts of the dyestuff of the formula

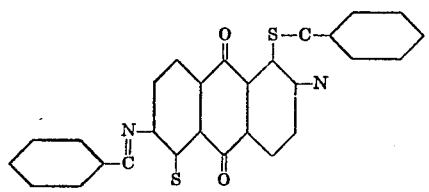

are added to a melt, prepared from 125 parts of aluminium chloride, 25 parts of sodium chloride, 1.25 parts of sodium fluoride and 3.68 parts of chlorosulfonic acid, at 80° C., and the whole is stirred for 4 hours at that temperature. The mixture is then heated up to 120° C. in the course of 2 hours, and then worked up as described in Example 1. The dyestuff so obtained dyes cotton strong yellow tints and has a chlorine content of about 12 percent.

Example 9

10 parts of indanthrene are added to a melt, prepared from 200 parts of aluminium chloride, 40 parts of sodium chloride, 2 parts of sodium fluoride and 40 parts of chlorosulfonic acid, at 140° C. The whole is stirred for ½ hour at 140° C., then for 2 hours at 160° C. and for a further hour at 180° C. The product is worked up as described in Example 1. The moist filter residue is then stirred with 1000 parts of water, 6 parts of sodium hydroxide and 10 parts of sodium hydrosulfite for 20 hours at 20° C. After being isolated and dried, the dyestuff has a chlorine content of about 32 percent.

Example 10

5 parts of 3:4:8:9-dibenzpyrene-quinone-(5:10) are added to a melt of 125 parts of aluminium chloride, 25 parts of sodium chloride, 1.25 parts of sodium fluoride and 5.25 parts of chlorosulfonic acid at 90° C., and the whole is stirred for 2½ hours at 90° C. and a further 2½ hours at 120° C. By working up in the usual manner there is obtained a yellow vat dyestuff having a chlorine content of about 15 percent.

Example 11

5 parts of thioindigo are added to a melt of 100 parts of aluminium chloride, 20 parts of sodium chloride and 7.9 parts of chlorosulfonic acid at 80° C. The mixture is stirred for 2 hours at 85° C., then for 2 hours at 100° C., then one hour at 110° C., ½ hour at 120° C. and ½ hour at 140° C. By working up there is obtained a red-violet powder containing about 29 percent of chlorine.

Example 12

200 parts of aluminium chloride, 40 parts of sodium chloride, and 23 parts of chlorosulfonic acid are heated at 140° C. until a clear melt is obtained. The melt is then cooled to 100° C. and 7.5 parts of dichloranthanthrone are added. In the course of 2½ hours the temperature is raised to 140° C., and the product is worked up as described in Example 1. The product so obtained has a chlorine content of about 36 percent.

Example 13

7 parts of the dyestuff used in Example 1 are added to a melt of 80 parts of ferric chloride, 20 parts of sodium chloride and 5 parts of chlorosulfonic acid at 160° C. The melt is stirred for 30 minutes at 160° C. and then poured on to 500 parts of hot water. As soon as all the iron salt is dissolved, the dyestuff is filtered off. It contains about 23% of chlorine.

Example 14

5 parts of the dyestuff used in Example 1 are added to a melt of 120 parts of anhydrous aluminium chloride, 25 parts of sodium chloride and 4.5 parts of sulfur trioxide at 100° C. The mixture is stirred for one hour at 95–105° C. and worked up as described in Example 1. A dyestuff is obtained which dyes cotton a similar tint to that described in Example 1 and contains about 25% of chlorine.

What is claimed is:

1. A process for the chlorination of an anthraquinone compound containing at most 7 benzene nuclei which comprises heating said compound at temperatures between 80–200° C. in an anhydrous chlorinating agent which contains anhydrous aluminium chloride and a compound of hexavalent sulfur selected from the group consisting of sulfur trioxide, anhydrous sulfuric acid, chlorosulfonic acid and fluorosulfonic acid and the metal salts thereof, and lower alkane sulfonic acids, at least one mol of aluminium chloride being used per mol of the sulfur compound.

2. A process for the chlorination of an anthraquinone compound containing at most 7 benzene nuclei which comprises heating said compound at temperatures between 80–200° C. in an anhydrous halogenation agent which contains anhydrous aluminium chloride and chlorosulfonic acid in presence of an inorganic salt lowering the melting point, at least one mol of aluminium chloride being used per mol of halogen sulfonic acid.

3. A process for the chlorination of an anthraquinone compound consisting of one 9,10-dioxoanthracene nucleus which comprises heating said compound at temperatures between 80–200° C. in an anhydrous halogenation agent, which contains anhydrous aluminium chloride and chlorosulfonic acid in presence of an inorganic salt lowering the melting point, at least one mol of aluminium chloride being used per mol of halogen sulfonic acid.

4. A process for the chlorination of an indigoid compound which comprises heating said compound at a temperature between 80 and 200° in an anhydrous halogenation agent, which contains anhydrous aluminium chloride and chlorosulfonic acid in presence of an alkali halide, at least one mol of aluminium chloride being used per mol of halogen sulfonic acid.

5. A process for the chlorination of anthraquinone which comprises heating said compound at temperatures between 80–200° C. in an anhydrous halogenation agent, which contains anhydrous aluminium chloride and chlorosulfonic acid, in presence of an alkali halide, at least one mol of aluminium chloride being used per mol of halogen sulfonic acid.

6. A process for the chlorination of acedianthrene which comprises heating said compound at a temperature between 80–200° C. in an anhydrous halogenation agent, which contains anhydrous aluminium chloride and chlorosulfonic acid in presence of an alkali halide, at least one mol of aluminium chloride being used per mol of halogen sulfonic acid.

7. A process for the chlorination of Bz-1-anthraquinonyl-amino-benzanthrone which comprises heating said compound at a temperature between 80–200° C. in an anhydrous halogenation agent, which contains anhydrous aluminium chloride and chlorosulfonic acid in presence of an alkali halide, at least one mol of aluminium chloride being used per mol of halogen sulfonic acid.

8. A process for the chlorination of indanthrene which comprises heating said compound at a temperature between 80–200° C. in an anhydrous halogenation agent, which contains anhydrous aluminium chloride and chlorosulfonic acid in presence of an alkali halide, at least one mol of aluminium chloride being used per mol of halogen sulfonic acid.

9. A process for the chlorination of thio-indigo which comprises heating said compound at temperatures between 80–200° C. in an anhydrous halogenation agent, which contains anhydrous aluminium chloride and chlorosulfonic acid in presence of an alkali halide, at least one mol of aluminium chloride being used per mol of halogen sulfonic acid.

References Cited in the file of this patent

UNITED STATES PATENTS 2,677,693    Nawiasky    May 4, 1954

FOREIGN PATENTS 193,200    Great Britain    Feb. 22, 1923

OTHER REFERENCES

Chemical Abstracts, vol. 16, 2851–2852 (1922).

UNITED STATES PATENT OFFICE
Certificate of Correction

Patent No. 2,862,930                                                                            December 2, 1958

Armin Caliezi et al.

It is hereby certified that error appears in the printed specification of the above numbered patent requiring correction and that the said Letters Patent should read as corrected below.

Column 2, line 12, for "anthranthrones" read —anthanthrones—; column 3, lines 47 and 48, for "mixturue" read —mixture—; column 4, lines 46 to 53, Example 8, the formula should appear as shown below instead of as in the patent:

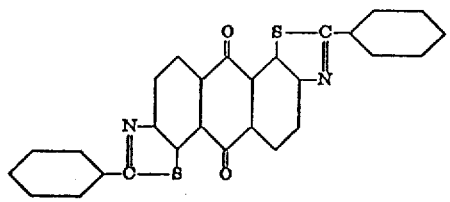

Signed and sealed this 3rd day of November 1959.

[SEAL]

Attest:
KARL H. AXLINE,
*Attesting Officer.*

ROBERT C. WATSON,
                                                     *Commissioner of Patents.*